July 8, 1952 B. B. ELLIOTT ET AL 2,602,388
METHOD OF TREATING SOIL
Filed July 27, 1945 3 Sheets-Sheet 1

Inventor
BURR B. ELLIOTT
GEO. S. ALLIN
BY Cook + Robinson
Attorneys

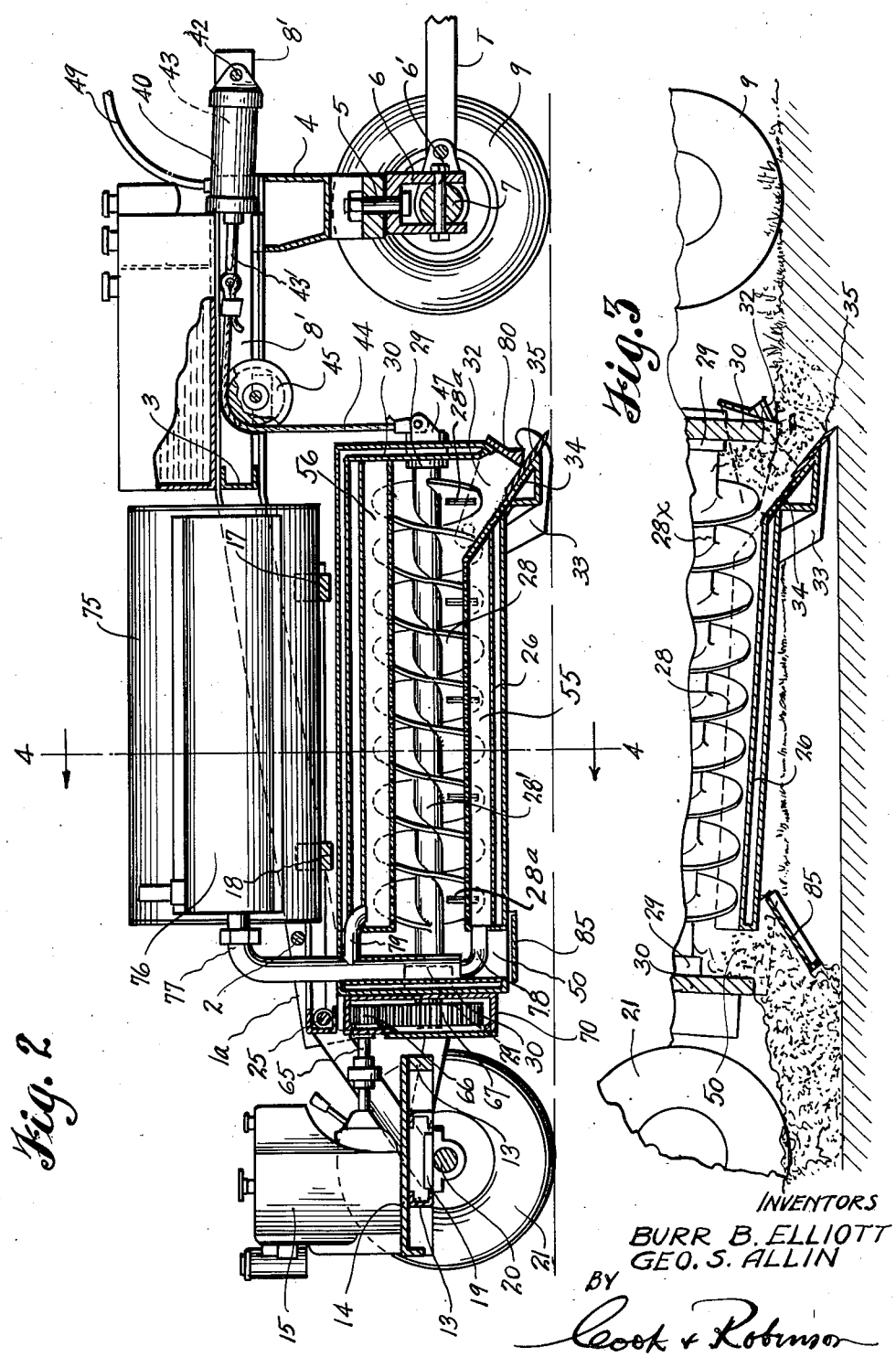

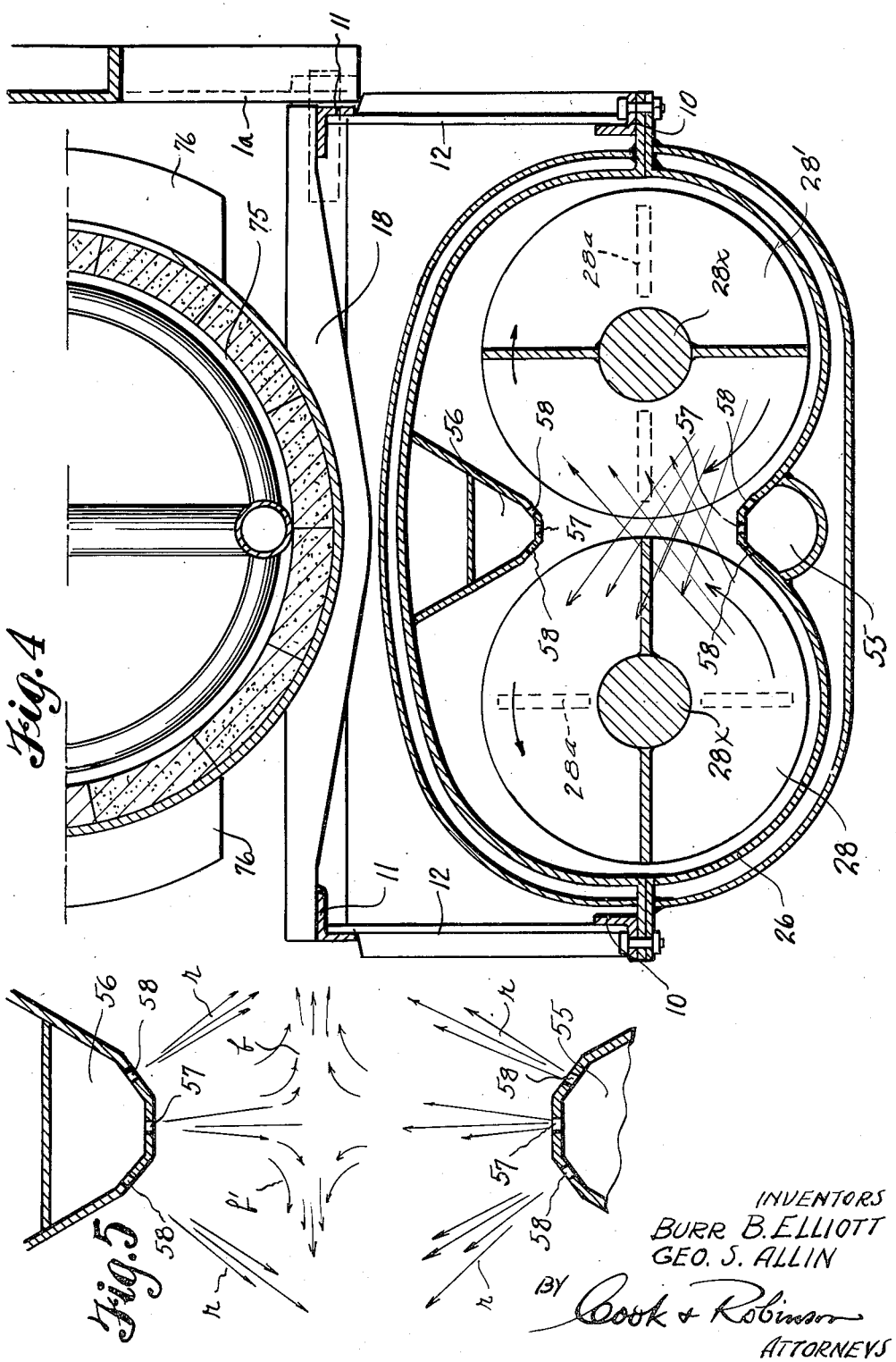

Patented July 8, 1952

2,602,388

UNITED STATES PATENT OFFICE 2,602,388

METHOD OF TREATING SOIL

Burr B. Elliott and George S. Allin,
Seattle, Wash.

Application July 27, 1945, Serial No. 607,450

2 Claims. (Cl. 97—10)

This invention relates to the treatment of arable lands for the revivification and sterilization of the soil for an increased production of useful crops thereon.

For better understanding of the present invention and its objects, it will be explained that soil lacks productivity when it cannot supply the necessary plant nutrients for the growing of crops thereon. As a general rule, when this lack of productivity is observed, a suitable commercial fertilizer is added to the soil. Very often the condition exists that the soil does actually contain ample plant nutrients, yet these nutrients cannot be released to the plants because of their association with other soil constituents such as colloids or mineral matter. Also, an excessively wide nitrogen-carbon ratio is detrimental to immediate soil productivity.

Still another condition frequently exists, and that is when the soil is fertile, but its ability to produce useful crops is nullified by reason of soil-infesting pests, such as fungi, bacteria, worms, insects, and the like, or by reason of weeds and roots of noxious plants.

The native fertility of arable soil and its productivity are dependent upon or are at least influenced to great extent by the water contained in the soil particles. The best authorities on soils teach that water may be present in soil in several general forms, such as combined hygroscopic, capillary and gravitational water.

The hygroscopic water is that which can move in the soil only by evaporating at one point and condensing at another. Hygroscopic water is that which is deposited as a thin film of condensed vapor on soil particles when soil material is exposed to water vapor.

Capillary water which is available to plants is that water which is held in soil against gravity after all free water is allowed to drain out.

Gravitational or free water is the excess water not influenced by the other factors and is the first to go off and the last phase to be satisfied.

Growing plants derive moisture from gravitational, capillary, and to some extent from hygroscopic water, but not from combined water. The plant nutrient must come from the colloidal particles containing minerals in soluble form or added as fertilizer. These nutrients may be free to go into solutions and hence into the plants, or they may have a reverse chemical reaction transferring them into unsoluble solutions, or they may leach away in the draining off of the free water.

It frequently is the case that analysis of soil samples taken from a field will indicate an ample supply of plant nutrients therein, yet the field will not produce a healthy crop without an extensive application of mineral fertilizer thereto. Chemical analysis cannot always distinguish between the usable and nonusable forms of plant nutrients in the soil.

Different soils have different ionic absorption and ionic exchangeability, and these properties influence the capacity of a soil to give up their own constituents and to absorb ions added through the medium of commercial fertilizers. The ability of different soils to absorb water varies widely.

It is general knowledge that the heating of a soil by boiling or by the action of steam increases the solubility of at least part of the soil constituents. It may be assumed that the heating of a damp soil by means of superheated steam might release certain mineral nutrients in accordance with this general observation. High heat in immediate contact with the water envelopes around soil colloidal particles should be particularly effective in accomplishing the release of certain mineral constituents.

As will presently be explained, the present method relates to heat treatment of soil to increase its productivity and makes use of superheated steam as distinguished from saturated steam. Saturated steam does not contain any excess heat and therefore will condense on surfaces of lower temperature. When superheated steam of the high temperature herein stated is applied to the soil, it will cause a vapor to be produced from a portion of the capillary water, and this will penetrate the small pores of the particles and cause expansion with an incident liberation of exchangeable cations. Heat applied to the water hull causes an increase of ionic activity. This heat application is quickly made when the superheat of the applied steam is absorbed by the soil and the latent heat of evaporation is dissapated therein. This condensation adds hot water directly to the soil mass.

There is a definite relationship between the cation exchange capacity, the content of exchangeable base, and the chemical and mineralogical composition of the soil colloidal matter. It is in this medium that heat treatments, as indicated, influence the course of plant nutrient release and absorption.

No current method thoroughly mixes surface residues, such as green manures and residues from harvested crops, throughout the full depth of the tillage cut or breaks down outer cell structure of such green manures for rapid decomposition. No present-day methods of soil treatment result in uniform granular structure to the full depth of the tillage cut whereby to obtain capillary contact with the subsoil, nor do they adequately kill fungal, bacterial, nematode, or insect pests, including their eggs and larvae or weed seeds, nor do they force the germination of weed seeds to the full depth of the tillage cut.

The present method and machine is an improvement over prior art.

The only use heretofore of superheated steam known to applicants is that disclosed in the Elliott Patent No. 2,272,190 (one of the present applicants), and the teaching of that patent lacks one of the principal features of the present invention, namely, the comminuting or pulverizing of the soil and treating the comminuted particles with the superheated steam while the soil particles are in separated condition. This results in the superheated steam making immediate and direct contact with a maximum of the crop pests with resulting destruction, but the soil mass emerging from the machine averages only an approximate 30° F. increase when using steam of 600° to 650° F. Soil thus treated is not rendered barren and useless for any period of time, but may be planted at once, with a most rapid germination and vigorous and healthy crop ensuing.

In view of the substance of the foregoing explanatory matter, it has been the principal object of the present invention to provide a practical, economical, feasible, and effective method of treating soils which have become nonproductive by reason of lack of productivity, or due to pest infestation, whereby to restore productivity thereon; whereby to destroy infesting insect or weed pests; whereby to increase the hygroscopic and capillary water-holding capacity; and to bring about optimum soil conditions for crop production incident to this treatment.

Another object of the present invention has been to provide a novel and practical method for the revivification and sterilization of soil of arable lands; whereby decomposition of green manures is accelerated and such manures rapidly converted to plant nutrient; whereby the soil, humus, manures, etc., are evenly mixed and redeposited on the ground in a homogeneous layer of uniform granular structure to the full depth of the tillage cut with adequate aeration and best conditions for aerobic microbiological processes and producing adequate capillary contacts with the subsoil; and finally to produce a method whereby microscopic and macroscopic insect pest life will be destroyed and weed seeds will be either killed or forced to germinate.

Yet another object is to provide a method of soil treatment for the above results that can be carried on at a speed and cost that makes it practical and feasible for farm cultivation.

Another object of the invention is to provide a method of soil treatment for the objects above stated that may be carried on without heating the soil to any noticeable extent and without causing damaging dehydration or other injury thereto.

Specifically stated, the present method of soil revivification and sterilization comprises the lifting of the top soil from the ground surface by means of a mobile machine; passing the lifted soil through a treating chamber wherein it is mechanically comminuted, the particles separated and then subjected individually to the action of the superheated steam by direct contact, then again laid on the ground in a homogeneous layer. A stationary machine using the same principle is contemplated for central treating plants.

Superheat of 400° to 700° has, in fields already treated, proved to be quite effective. However, it is to be understood that treating temperature would be determined in accordance with conditions existing in each field. Variable conditions of moisture or soil content can be met by either increasing or decreasing the treating interval or by increasing or decreasing the degree of superheat or volume of steam used.

By comminuting the soil, the surface area that may be exposed to superheated steam is multiplied several thousand times the area of the soil on entering the comminuting machine. With reference to the advantages of using superheated steam instead of saturated steam and hot gases from burning oil or the like, it may be said that saturated steam condenses instantly when it contacts a surface of lower temperature. This instant condensation gives off a tremendous amount of heat instantly into the object on which it condenses. Hot gases such as produced by burning flame have not heat of vaporization, and therefore they do not condense. Hence their heat transfer is too slow and too small a quantity for the present operation. Also, the heat is dry and actually dehydrates the soil which is a definite hindrance to the soil fertility. Obviously there is no penetration in use of saturated steam, while to the contrary, superheated steam can, and in this case does, carry excess heat enough to lift the surface temperature high enough to cause the steam to penetrate to the hygroscopic water.

The basis for the present method in so far as it concerns weed and insect pest destruction is based upon the discovery that such pest life may be destroyed by a momentary contact with superheated steam and that if the soil is comminuted and the particles separated, the pests therein will thereby be released, or exposed, and may then be subjected to superheated steam contact.

In accomplishing the above and other objects of the present invention, we have provided apparatus illustrated in the accompanying drawings, wherein:

Fig. 2 is a central longitudinal, sectional view of the machine;

Fig. 3 is a sectional detail showing a part of the treating chamber as adjusted for lifting dirt from the ground;

Fig. 4 is a cross-sectional view on line 4—4 in Fig. 2;

Fig. 5 is a cross-sectional detail of the steam manifolds, particularly illustrating the pattern of the steam jets.

Figures 1, 1A:
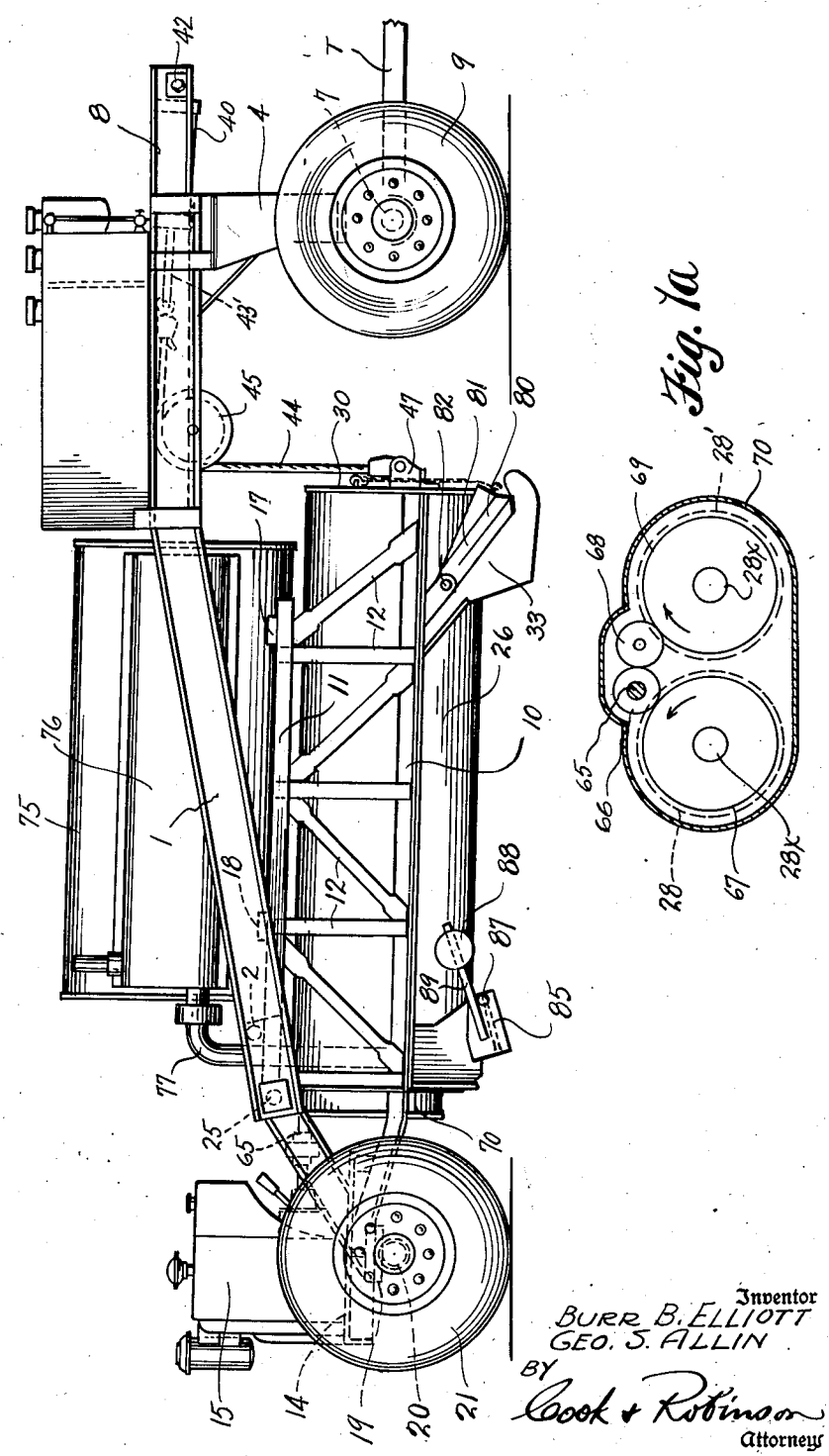
Fig. 1 is a side view of a soil-treating machine suitable for practicing the present method.
Fig. 1a is a diagrammatic illustration of the driving gears for the dirt conveyer screws.

In a general description, the present preferred machine for carrying out the method of soil treatment for revivification and sterilization is of a type adapted to be drawn by a prime mover; for example, by means of a tractor. However, the unit might be constructed for self-propulsion if so desired. As illustrated, the machine comprises a main frame structure and an auxiliary frame hingedly secured thereto; these parts being supported by forward and rearward sets of ground wheels. Supported in the auxiliary frame is an elongated treating tunnel, and this is equipped at its forward end with a receiving opening and a forwardly and downwardly inclined blade set within the opening and adapted, as the vehicle advances, to dig up the soil to a depth determined by the suspension of the tunnel and to advance the lifted soil into the tunnel through its receiving opening.

Inside the treating tunnel two oppositely rotating conveyer screws are contained, and these are driven at sufficiently high rim speed to break up and comminute the soil, to separate the particles, and to move the separated and comminuted soil particles in suspension through the tunnel for treatment and to the discharge opening for outflow onto the ground and into the channel formed by the digging blade, leaving the returned soil finely comminuted and effectively aerated.

Lengthwise and centrally of the treating tunnel, above and below the coacting edges of the conveyer screws, are steam distributing manifolds formed with discharge ports opening therefrom into the tunnel. Carried on the main frame is a boiler whereby steam is produced and superheated, and pipes leading from the boiler deliver the superheated steam to the manifolds from which it is admitted to the tunnel for effecting that treatment of the soil that results in its revivification and sterilization as previously mentioned.

An engine is mounted on the auxiliary frame for rotating the soil conveyer screws, and a power device is provided for raising or lowering the forward end of tunnel thereby to adjust or maintain the working depth of the blade.

Referring more in detail to the drawings,

The forward portion of the main frame structure of the machine comprises the transversely spaced, coextensive, opposite side beams 1 and 1a which extend generally in horizontal direction between the forward and rearward trucks. The rearward end portions of these two beams are somewhat downwardly inclined and are rigidly joined near their lower or rearward ends by a cross shaft 2 and are likewise rigidly joined at their forward ends by a cross beam or bar 3. Forwardly of the cross bar 3, the forward end portions of the beams 1 and 1a converge in a forward direction and at their ends are rigidly and permanently fixed, by welding or otherwise, to a downwardly extended support or post 4 which, at its lower end, has a vertical pivot pin connection 5 with a bearing yoke 6, which yoke, in turn, has a pivotal mounting comprising the horizontal pin 6', with the forward cross axle 7. The post 4 is braced by a pair of spaced, longitudinally extending beams 8 and 8' that are fixed to the post and to the cross bar 3. The beams 8 and 8' extend forwardly of the post for a purpose presently explained.

The cross axle 7 is equipped at its ends with ground wheels 9—9 and to this axle a tongue T is attached for drawing the machine. It is anticipated that a farm tractor will be employed as the prime mover.

The auxiliary frame of the machine comprises spaced apart, opposite side portions of trusslike, angle iron construction, each portion having a longitudinal bottom chord 10, and a top chord 11 joined by vertical and diagonal connecting and bracing members 12. These two side portions are rigidly joined across their rearward ends by a plurality of cross beams 13 which support a platform or base 14 on which an engine 15 is mounted, for a purpose presently explained. The top chords of the opposite side portions of the frame are likewise rigidly joined at their forward ends and intermediate their ends by cross bars 17 and 18 which are designed as cradles for the support of the steam-generating boiler and superheaters as presently more fully described.

The rear end portions of the trusslike section of this frame are equipped with flanges 19 for their fixed securement to a cross axle 20 whereby the rear end of the machine is supported, and this axle is supported at its ends by the ground wheels 21.

In the assembled relationship of the frame sections, the side beams 1 and 1a of the main frame extend along the opposite sides of the auxiliary frame with their rearward end portions lying outside of and adjacent the rear end portions of the top chords 11. Pivot studs 25 extend from the opposite side portions of the frame through the rear end portions of the beams 1 and 1a to thereby hingedly join the parts, thus providing a means of support for the rear end of the main frame section and permitting relative up-and-down adjustment of the forward end of the auxiliary frame, as required for the adjustment of the blade to and from digging position. The forward end of the main frame extends beyond the forward end of the auxiliary frame sufficient for ample wheel clearance, in turning, as will be understood by reference to Fig. 1.

Supported between the opposite side portions of the auxiliary frame is the steam tunnel or housing within which the soil is treated with superheated steam. This tunnel is an elongated, tubular housing 26, of sheet metal, disposed lengthwise of the machine, and rigidly and solidly secured in place by direct connection to the bottom chords 10 of the truss-like frames, as has been shown in Fig. 4.

In cross section, the treating tunnel is shaped to contain therein two parallel conveyer screws of substantial diameter and extending substantially the full length of the tunnel. These screws, designated by numerals 28 and 28', have their mounting shafts 28x rotatably contained in bearings 29 mounted in the opposite end walls 30 of the tunnel housing.

At its forward end, the tunnel housing is formed with a transverse, downwardly directed opening 32, and about this opening a frame or housing 33 is solidly fixed to the tunnel for support of the forward edge of a forwardly and downwardly inclined wall 34 which, across its lower edge, mounts a digging blade 35 that, on lowering of the tunnel at its forward end will be brought into ground contact, and thus a strip of earth will be dug up as the vehicle advances, and this strip will be advanced up the inclined wall 34 and into the forward end of the tunnel through opening 32, there to be picked up by the conveyer screws and delivered rearwardly through the treating tunnel.

Lugs 28A are welded to the driving surfaces of the helical conveyers to beat, break up and tear apart soil clinging to rocks, clods, and sod. Large solid objects move along the bottom of the tunnel and drop out without damage to the machine, but the broken up soil is thrown by the oppositely rotating screws in a cross fire action from one side of the tunnel toward the other crossing at the longitudinal center of the tunnel. It has been observed that the progression of soil from the receiving end of the tunnel to the outlet follows a definite pattern which is substantially that of a progressively advancing and repeating figure 8, as will be understood by reference to the direction arrows in Fig. 4. This results in the passing of all particles repeatedly from one side of the tunnel to the other and an effective mulling and mixing to take place.

The raising and lowering of the forward end of the treating tunnel, whereby to move the blade into and from ground contact and to determine and maintain its digging depth, is accomplished by means best shown in Fig. 2, wherein it is shown that a hydraulic jack cylinder 40 is horizontally disposed between the forward end portions of the brace beams 8 and 8', which beams, as noted in Figs. 1 and 2, extend somewhat beyond the forward ends of beams 1 and 1a and the post 4. This jack cylinder is pivotally supported at its forward end by a transverse pivot pin 42 passed through its end head and through the beams 8 and 8'. Contained in the jack cylinder is piston 43, with piston rod 43' extended rearwardly from the jack. Fixed to the rear end of the piston rod 43' is a cable 44 that passes over a pulley 45 supported between the rearward end portions of the brace beams, and at its end is attached to a bracket 47 that is fixed to the forward end wall 30 of the tunnel housing.

A conventional cable power unit or winch could be substituted for the hydraulic jack to do the same work.

Hydraulic pressure medium is applied to the cylinder from a source of supply through a flexible pipe 49 to control the piston movement, and this movement may be such as to effect the raising and lowering of the forward end of the tunnel as desired, or required, for digging up a strip of dirt, to any desired depth, or to hold the blade clear of the ground.

The transverse length of the blade determines the width of the strip of soil to be lifted, and the depth of the strip lifted should be somewhat below that depth to which the pests infest it. In the machine shown, the maximum depth is about eight inches, but could be more or less, and the blade length is about four feet.

Soil that is received into the treating tunnel at its forward end is ultimately discharged therefrom, after treatment, through an opening 50 that is formed in the bottom wall at the rear end of the tunnel. When discharged, the treated soil falls onto the ground to fill the channel made by the blade and is in prime condition for seeding.

The design of the tunnel, the location, character and action of the conveyor screws therein, and the place of admittance and character of superheated steam are of importance. In the cross sectional view of the tunnel, seen in Fig. 4, it is to be observed that the two parallel conveyor screws 28 and 28' are horizontally spaced and are quite closely arranged, and that the tunnel walls, in extending about the bottom portions of these screws and up their sides, are close to and conform to the axial lines of curvature of the screws. Across the top of the housing, the tunnel is somewhat upwardly arched, thus to provide a longitudinal treating space between the screws and top of the tunnel of substantial volume. The space between the side walls of the tunnel and screws is narrow and facilitates the pulverizing action on the soil in its rearward travel in the tunnel.

In this connection it will be understood that the capacity of the tunnel is ample for all dirt received from the blade and permits a considerable amount of open space between the particles of comminuted soil for the steam.

The upwardly curved portions of the bottom wall of the tunnel, and also those downwardly curved portions of the top wall that conform to the cylindrical curvature of the two screws, form ridges which (see Fig. 4) longitudinally divide the tunnel and define the bottom and top limits of a somewhat restricted central, longitudinal passage therein through which the dirt particles are thrown by the screws from side to side in their progression. Contained within these longitudinal ridges are tubular manifolds 55 and 56 designed to receive superheated steam for its uniformly distributed admittance to the treating tunnel.

The manifolds 55 and 56 are formed with longitudinal rows of perforations in definite locations and direction to define a definite and predetermined steam pattern. By reference to Fig. 4 it is observed that the two manifolds are symmetrically located relative to the horizontal axial plane of the screws. One is directly above the other, and each is provided along its center with a row of closely spaced perforations 57 from which jets of steam will be discharged directly toward and into those from the other manifold. These jets will oppose each other, and the impinging blasts therefrom will result in opposite and directly lateral blasts, as indicated at $b$ and $b'$ in Fig. 5. Also, each manifold is formed along opposite side portions with rows of ports or orifices 58, and these are so directed as to cause the steam jets $r$ to be directed at an angle outwardly from the center line of jets. The cross-sectional pattern defined by the steam jets from the four rows of ports 58 is that of a diamond, and this pattern extends the length of the tunnel.

The two conveyor screws turn at high rate in opposite direction, as indicated by the direction arrows placed thereon in Fig. 4. In operation their top edges travel outwardly, and their lower portions travel toward each other. This direction of rotation, in consideration of the fact that the screws are of opposite pitch, and the pitch is in such direction as to move the dirt toward the rear of the tunnel, will cause the dirt that is dug up and advanced up the inclined plate into the tunnel, to be picked up, finely comminuted, and the particles thrown back and forth across the tunnel.

The comminution of the soil releases from the particles, or at least exposes the crop pest organisms, such as eggs, larvae, pupae, insects, seeds and roots of weeds and grasses so that they may be directly contacted by the superheated steam and heat liberated thereto from the steam.

In the present instance the time of exposure of the soil particles and released organisms to concentrated steam is from two to three seconds, and this has proven adequate for the effect desired.

The driving of the two conveyor screws is here accomplished by means of the engine 15 mounted on the platform 14. The engine shaft has a driving connection, indicated at 65, with a small gear wheel 66 which, in turn, is in driving mesh with a larger gear wheel 67 fixed to the drive shaft of a screw 28, and the other screw is driven in an opposite direction and at the same speed through the mediacy of a gear wheel 68 that meshes with the driven gear wheel 66 and with a larger gear wheel 69 that is fixed on the drive shaft of the other screw. These gears are enclosed in a housing 70, as noted in Fig. 2. In a machine now designed for use, the tunnel is eight feet long, the conveyor screws are 24 inches in diameter and have a twenty-inch pitch. The peripheral speed of rotation is approximately fourteen feet per second.

In the use of this machine, the boiler, designated in its entirety by numeral 75, is equipped with superheaters indicated at 76. From the superheaters a pipe 77 leads to the rear end of the treating chamber and there has pipe connections 78 and 79 with the manifolds 55 and 56. Suitable burners, not herein shown, supply heat to the boiler for the generation and superheating of the steam. For best results, the steam should be at a temperature of 500° F. or above. The superheated steam is admitted from the manifolds into the treating chamber at approximately two pounds' gauge pressure.

In order that steam admitted to the treating tunnel may not freely escape to atmosphere through the bottom wall openings of the tunnel at its forward and rearward ends, automatic closure means are provided for these openings which will move between open and closed positions in accordance with the inflow or outflow of soil to the chamber.

At the forward end of the tunnel, a transverse apron 80 is pivotally suspended from the tunnel by arms 81 at its ends secured by pivots 82. The apron operates as a sled runner that rides up and down, in contact with the ground just forward of the tunnel, thus to automatically retain the inlet to the tunnel closed against escape of steam from the treating chamber.

Likewise, at the rear end of the tunnel, a transverse closure plate 85 is pivotally suspended from the forward edge of the housing formed about the discharge opening by pivots 87, and this plate underlies the discharge opening 50 and is urged toward closed position by weights 88 on lever arms 89 fixed to the plate and extended forwardly of the pivots. The arrangement is such that weight of outflowing dirt is applied to the plate, and the plate will open downwardly only to the extent required for the discharge of the dirt and will thus prevent escape of steam from the tunnel at this end. When no dirt is flowing out, then the opening is completely closed by the plate.

A superheater like that shown in United States Letters Patent No. 2,272,190, or other suitable means, might be employed for the purpose of steam generation and for bringing it to a desired degree of superheat.

It will be understood then that with the particles of dirt being thrown by the conveyer screws in a cross-fire manner from one side of the tunnel to the other, they will be cast directly through the jets of steam in that diamond-shaped concentrated area. Each soil particle will be brought intimately into contact with the steam blasts each time it passes from one side to the other and will be effectively treated. The effect of the comminuting of the soil by the action of the screws and the steam treatment is first to get the soil into sufficiently small particles that when they are impinged by the jets of superheated steam in passing through the diamond-shaped pattern, the resultant instant transfer of heat units from the steam to the colloidal substances will cause expansion and disruption of the formation and an incidental condensation of the steam on the particles. This heat transfer greatly increases chemical reactions for a short period of time. In many cases these reactions will double in speed for each 10° rise in temperature. Also, by the comminuting of the soil, the pest life and weed seeds therein are exposed or separated from the soil and may be killed by the heat transferred thereto by the condensation of steam thereon.

Furthermore, the outer cell structure of roots, weeds, and green manures is broken down so that decomposition is unbelievably accelerated. Other beneficial results for the comminuting of soil will later be explained.

While it is most desirable and practical that machines for the present purpose be mobile, it is quite apparent that from the standpoint of soil treatment alone, this could be quite effectively done in a stationary machine to which the soil can be brought for treatment, and it is for this reason that claims are herein included that are based on the subjecting of the finely comminuted soil to treatment by superheated steam without limitation as to whether the machine is stationary or mobile.

In the foregoing, we have disclosed the invention as applied to the treatment of soil of arable lands. It is anticipated, however, that the method is applicable also to the treatment of ordinary fertilizing manures preparatory to distributing this manure over a tract of land. It is a fact that ordinary barnyard manure contains many of the crop pests and weed seeds that are found in soil, and it is detrimental in some cases to apply pest-infested manures to the soil. Therefore, by treating this material by passing it through the treating chamber of a machine similar to that described, it can be effectively sterilized so that when applied to the soil, there will be none of the undesirable results.

The process would be merely to pass the material through the treating chamber and subject it to the treatment of superheated steam in the same manner as soil is treated, as has already been described.

Such treatment of manure would not only effectively sterilize it, but would also thoroughly mix and break down the plant cell tissues to bring about a rapid disintegration after it had been applied to the soil.

The term "soil" as used in the appended claims is intended to cover, include, and encompass manures of every character, as well as natural earth particles.

While some of the statements herein made with reference to the action and effect of the superheat from steam on the soil particles is based upon the teachings of scientific writings and textbooks by recognized authorities and may be more or less theoretical, there are certain results from the method that are not theoretical and can be and have already been observed and demonstrated. These are: the destruction of macroscopic crop pest organisms such as insects, worms, bugs, the eggs and larvae of bugs or insects, etc.; the breakdown of the cell structure of green manures that brings about the rapid and complete decomposition; the forced germination of weed seeds that are not killed; the increased ability of the soil to absorb surface moisture; and the rapid and unusual growth of crops on treated soil. Therefore, regardless of the correctness or incorrectness of the theories herein set out, the main objects of the invention, viz., the revivification or increased productivity of the soil and the destruction of crop pest organisms, are accomplished by the method of soil treatment that is herein disclosed.

In the claims which terminate the specification, the terms "soil particles," "comminuating the soil," "superheated steam of high degree of superheat," and similar expressions have been used, and in this connection it may be said that it is not contended that every soil particle that passes through the treating chamber will be exposed to the steam, or that all will receive a like treatment. The term "soil particles" has reference to the pieces into which the soil is divided by the act of comminuting it, and their size may vary but should be sufficiently small that under the volume of steam and degree of superheat employed, they will be affected to the depth or extent necessary to produce the results desired.

The steam should contain such degree of superheat as to be effective for the intended purpose within the time interval employed. The moisture content in the soil being treated will vary with different kinds of soil. Sandy soil might be considered wet with a moisture content that in peat soil would be dry. Therefore, the volume of steam employed will vary with soils and moisture content of soils. The degree of superheat need not be changed to any material extent for different soils and in our experiences should be within a range of 400° F. to 700° F., while the time interval of treatment may be considered but momentary, and this would be only a matter of seconds as differentiated from the minutes necessary for other forms of treatment which have been discussed. The momentary treatment also presupposes the treating of the soil particles in a manner that does not result in bringing the soil up to the temperature of the treating medium or approach that which would be injurious to the soil.

Furthermore, the expression used in the claims "subjecting the particles to contact with superheated steam" is not to imply that every particle is individually treated, but rather to imply that degree of completeness that is to be expected when the comminuted soil is passed in a loose, suspended condition through the area of concentrated superheated steam.

Having thus described our invention, what we claim as new therein and desire to secure by Letters Patent is:

1. The method of treating the soil of agricultural land to increase its productivity, comprising comminuating the soil and causing it to be cast in a loose, suspended condition through an area of concentrated superheated steam within a temperature range of 400° to 700° F.

2. The method of treating the soil of agricultural land, comprising comminuting the soil and causing it to be cast in a loose, suspended condition through an area of concentrated superheated steam of constant supply and of such degree of superheat as to be lethal to exposed crop pest organisms and the time interval of exposure of the comminuted soil to said superheat being insufficient to result in detrimentally heating the soil.

BURR B. ELLIOTT.
GEORGE S. ALLIN.

REFERENCES CITED

The following references are of record in the file of this patent:

UNITED STATES PATENTS

| Number | Name | Date |
|---|---|---|
| 1,303,149 | August | May 6, 1919 |
| 2,272,190 | Elliott | Feb. 10, 1942 |

FOREIGN PATENTS

| Number | Country | Date |
|---|---|---|
| 192,511 | Switzerland | Aug. 31, 1937 |
| 437,421 | Great Britain | Oct. 29, 1935 |